United States Patent
Lim

(10) Patent No.: US 9,631,510 B2
(45) Date of Patent: Apr. 25, 2017

(54) TURBINE SEAL ASSEMBLY AND TURBINE APPARATUS COMPRISING THE TURBINE SEAL ASSEMBLY

(71) Applicant: HANWHA TECHWIN CO., LTD., Changwon-Si (KR)

(72) Inventor: Chan-sun Lim, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 294 days.

(21) Appl. No.: 14/379,636

(22) PCT Filed: Feb. 13, 2013

(86) PCT No.: PCT/KR2013/001103
§ 371 (c)(1),
(2) Date: Aug. 19, 2014

(87) PCT Pub. No.: WO2013/129788
PCT Pub. Date: Sep. 6, 2013

(65) Prior Publication Data
US 2015/0003972 A1     Jan. 1, 2015

(30) Foreign Application Priority Data

Feb. 29, 2012  (KR) .................. 10-2012-0021419

(51) Int. Cl.
*F01D 11/14* (2006.01)
*F02C 7/28* (2006.01)
(Continued)

(52) U.S. Cl.
CPC ............. *F01D 11/14* (2013.01); *F01D 11/10* (2013.01); *F01D 11/20* (2013.01); *F02C 3/20* (2013.01); *F02C 7/28* (2013.01); *F02C 9/40* (2013.01)

(58) Field of Classification Search
None
See application file for complete search history.

(56) References Cited

U.S. PATENT DOCUMENTS

| 4,436,311 A | 3/1984 | Brandon |
| 5,344,284 A * | 9/1994 | Delvaux ................. F01D 11/22 415/173.2 |

(Continued)

FOREIGN PATENT DOCUMENTS

| JP | 2005-9410 A | 1/2005 |
| KR | 10-2007-0026217 A | 3/2007 |

OTHER PUBLICATIONS

International Search Report dated May 10, 2013 issued in International Application No. PCT/KR2013/001103 (PCT/ISA/210).

(Continued)

*Primary Examiner* — Igor Kershteyn
*Assistant Examiner* — Justin Seabe
(74) *Attorney, Agent, or Firm* — Sughrue Mion, PLLC

(57) ABSTRACT

According to an aspect of an exemplary embodiment, there is provided a turbine seal assembly comprising: a seal installation groove formed inside a casing; at least one seal member that has at least one tip portion formed in a blade direction and is installed in the seal installation groove; at least one elastic member for elastically connecting the casing to the seal member, wherein an inlet for an inflow of compressed gas is formed in the seal installation groove, and wherein a first space which the compressed gas enters is formed in the seal member, and at least one flow pathway which connects the first space to a space between a blade and the seal member is formed in the seal member.

10 Claims, 3 Drawing Sheets

(51) Int. Cl.
  *F01D 11/10* (2006.01)
  *F01D 11/20* (2006.01)
  *F02C 3/20* (2006.01)
  *F02C 9/40* (2006.01)

(56) References Cited

U.S. PATENT DOCUMENTS

| | | |
|---|---|---|
| 5,603,510 A | 2/1997 | Sanders |
| 6,224,328 B1 * | 5/2001 | Weigand ............... F01D 5/08 415/115 |
| 7,344,357 B2 | 3/2008 | Couture, Jr. et al. |
| 7,435,049 B2 * | 10/2008 | Ghasripoor ............ F01D 5/225 277/415 |
| 7,448,849 B1 * | 11/2008 | Webster ............... F01D 11/005 415/128 |
| 2004/0022626 A1 | 2/2004 | Burdgick |
| 2005/0047909 A1 | 3/2005 | Parry |
| 2005/0220610 A1 | 10/2005 | Ghasripoor et al. |
| 2007/0071594 A1 | 3/2007 | Montgomery |
| 2010/0239414 A1 * | 9/2010 | Tesh ................... F01D 11/001 415/173.7 |
| 2011/0236189 A1 | 9/2011 | Ono et al. |

OTHER PUBLICATIONS

Written Opinion dated May 10, 2013 issued in International Application No. PCT/KR2013/001103 (PCT/ISA/237).

* cited by examiner

FRONT DIRECTION ← → REAR DIRECTION

TURBINE SEAL ASSEMBLY AND TURBINE APPARATUS COMPRISING THE TURBINE SEAL ASSEMBLY

TECHNICAL FIELD

Exemplary embodiments relate to a turbine seal assembly and a turbine apparatus comprising the turbine seal assembly.

BACKGROUND ART

A turbine apparatus converts energy of a fluid (such as water, gas, or steam), into valuable work.

In particular, in a gas turbine apparatus, gas at high temperature and high pressure discharged from a combustor enters the turbine apparatus and hits the blades of the turbine apparatus, thereby rotating the output axis of the turbine apparatus.

DISCLOSURE OF INVENTION

Technical Problem

In gas turbine apparatuses, turbine performance may be enhanced by increasing a seal performance, and Japanese Patent Publication No. 2003-254006 discloses a technique for increasing the number of seal fins while reducing the risk of rubbing in order to increase the seal performance.

Solution to Problem

One or more exemplary embodiments provide a turbine seal assembly including a seal member having increased motion control performance, and a turbine apparatus comprising the turbine seal assembly.

According to an aspect of an exemplary embodiment, there is provided a turbine seal assembly comprising: a seal installation groove formed inside a casing; at least one seal member that has at least one tip portion formed in a blade direction and is installed in the seal installation groove; at least one elastic member for elastically connecting the casing to the seal member, wherein an inlet for an inflow of compressed gas is formed in the seal installation groove, and wherein a first space which the compressed gas enters is formed in the seal member, and at least one flow pathway which connects the first space to a space between a blade and the seal member is formed in the seal member.

Advantageous Effects of Invention

According to exemplary embodiments, seal performance may be improved by improving performance for controlling movement of a seal member.

BRIEF DESCRIPTION OF DRAWINGS

The above and other aspects will become more apparent by describing in detail exemplary embodiments thereof with reference to the attached drawings in which.

BEST MODE FOR CARRYING OUT THE INVENTION

Figure 1:
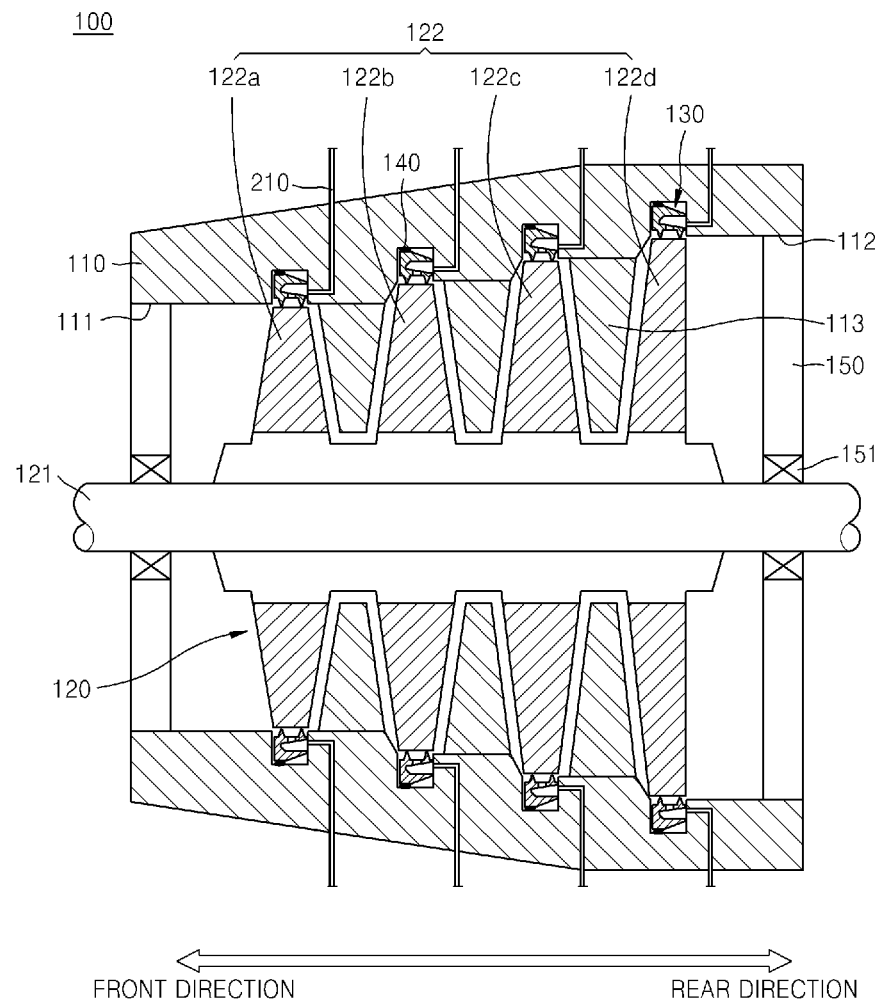
FIG. 1 is a cross-sectional view of a turbine apparatus according to an exemplary embodiment.

According to an aspect of an exemplary embodiment, there is provided a turbine seal assembly comprising: a seal installation groove formed inside a casing; at least one seal member that has at least one tip portion formed in a blade direction and is installed in the seal installation groove; at least one elastic member for elastically connecting the casing to the seal member, wherein an inlet for an inflow of compressed gas is formed in the seal installation groove, and wherein a first space which the compressed gas enters is formed in the seal member, and at least one flow pathway which connects the first space to a space between a blade and the seal member is formed in the seal member.

The elastic member may be a plate spring.

A thermal expansivity of a material of the elastic member may be different from a thermal expansivity of a material of the casing.

The first space may be closed in a front direction of the blade.

The inlet may be connected to a compressed gas tube connected to a compressor.

According to an aspect of another exemplary embodiment, there is provided a turbine apparatus comprising: a casing in which a seal installation groove is formed; a rotor that is installed inside the casing and has a plurality of blades; at least one seal member that has at least one tip portion formed in a blade direction and is installed in the seal installation groove; at least one elastic member for elastically connecting the casing to the seal member, wherein an inlet for an inflow of compressed gas is formed in the seal installation groove, and wherein a first space which the compressed gas enters is formed in the seal member, and at least one flow pathway which connects the first space to a space between a blade and the seal member is formed in the seal member.

The tip portion may comprise a first tip portion and a second tip portion formed apart from the first tip portion, and a space between the first tip portion and the second tip portion is connected to the flow pathway.

A thermal expansivity of a material of the elastic member may be different from a thermal expansivity of a material of the casing.

The first space may be closed in a front direction of the blade.

The inlet may be connected to a compressed gas tube connected to a compressor.

Mode for the Invention

The exemplary embodiments will be described more fully with reference to the ac-companying drawings. Like reference numerals in the specification and drawings denote like elements, and thus their repetitive description will be omitted.

Figure 2:
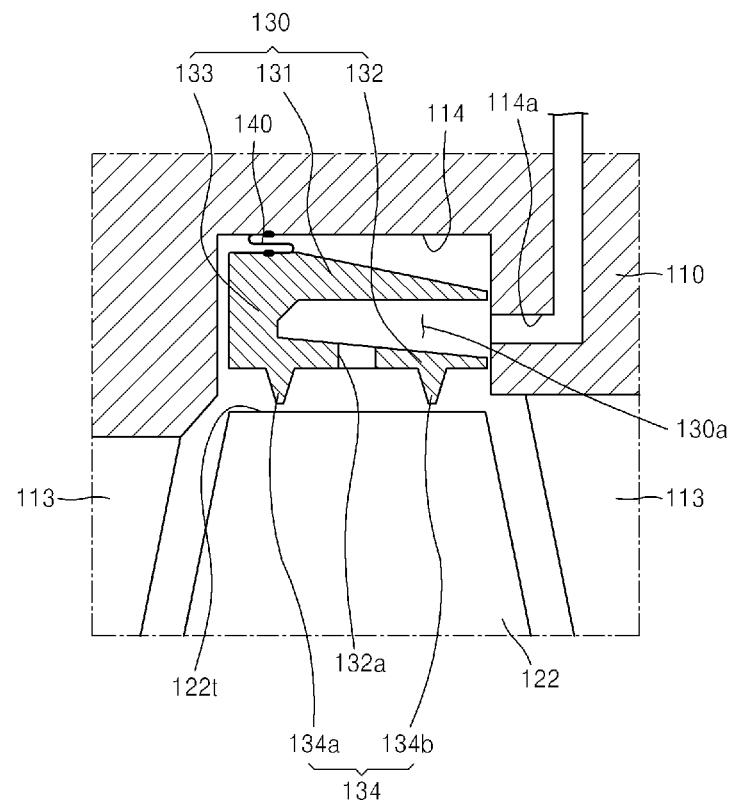
FIG. 2 is a magnified cross-sectional view of a seal assembly of the turbine apparatus of FIG. 1.
Figure 3:
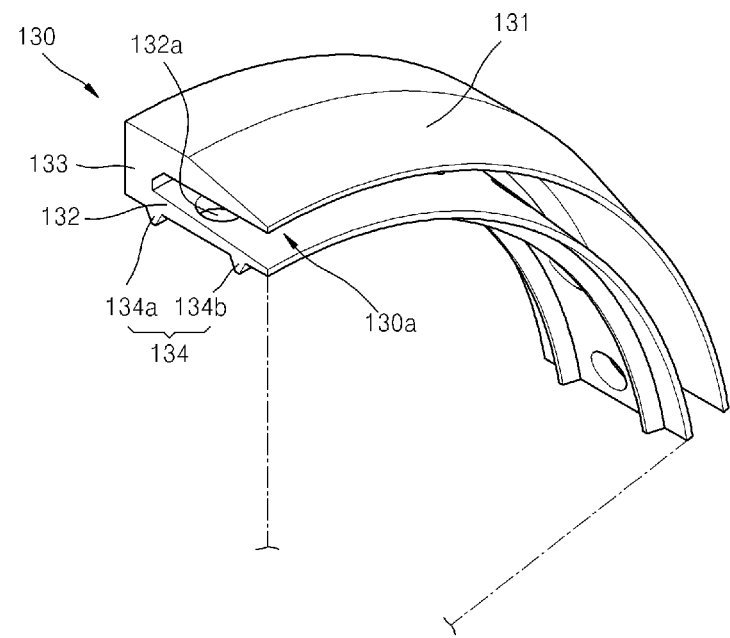
FIG. 3 is a perspective view of a seal member of the turbine apparatus of FIG. 1.
Figure 4:
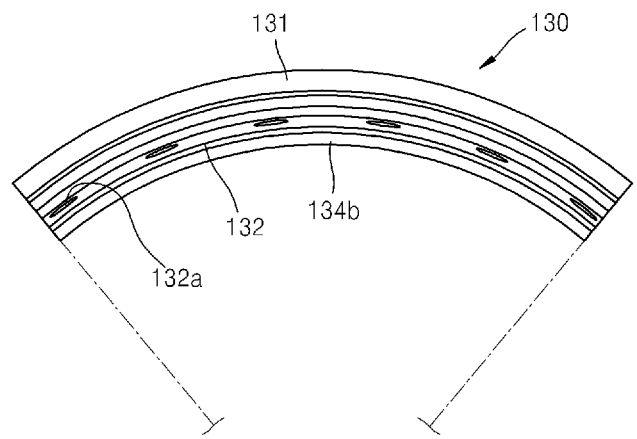
FIG. 4 is a front view of the seal member of FIGS. 3.

FIG. 1 is a cross-sectional view of a turbine apparatus 100 according to an exemplary embodiment, FIG. 2 is a magnified cross-sectional view of a seal assembly of the turbine apparatus 100 of FIG. 1, FIG. 3 is a perspective view of a seal member of the turbine apparatus 100 of FIG. 1, and FIG. 4 is a front view of the seal member 130 of FIG. 3.

As shown in FIG. 1, the turbine apparatus 100 has a multistage turbine structure having 4 stages and includes a casing 110, a rotor 120, the seal member 130, an elastic member 140, and a frame 150. In the configuration of the turbine apparatus 100, a part directly related to a seal operation may be called a seal assembly, and in the current embodiment, the seal assembly may be a structure including a portion of the casing 110, the seal member 130, and the elastic member 140.

The casing 110 has an internal space in which gas flows, and the rotor 120, the seal member 130, and the elastic member 140 are accommodated in the internal space.

An intake 111 for inflow of gas at high temperature and high pressure from a combustor (not shown) is formed in a front direction of the casing 110, and an outlet 112 for discharging expanded gas is formed in a rear direction of the casing 110.

Nozzle vanes 113 are installed between rows of blades 122 of the rotor 120 inside the casing 110 to guide the gas flown in to effectively hit the blades 122. Since this configuration of the nozzle vanes 113 may be well-known and commonly used for general multistage turbines, a detailed description of the structure and arrangement is not provided here.

As shown in FIG. 2, a seal installation groove 114 is formed inside the casing 110 in a circumference direction around the rotor 120.

An inlet 114a for introducing compressed gas is formed in the seal installation groove 114 to be connected to a compressed gas tube 210 connected to an external compressor (not shown). A designer may select a compressor having a plurality of stages as the external compressor and also select a configuration for connecting the compressor to the compressed gas tube 210 in order to receive compressed gas at an appropriate location of each pressure stage. Alternatively, the designer may select a configuration including a plurality of external compressors, each external compressor generating compressed gas at a different pressure, and in this case, the compressed gas generated by each external compressor flows through a corresponding compressed gas tube 210.

The rotor 120 includes a rotation axis 121 functioning as an output axis and the blades 122 for generating a rotational force when hit by the inflow of gas.

The rotation axis 121 is supported by bearings 151 installed on the frame 150.

The blades 122 generate a rotational force when hit by the gas guided by the nozzle vanes 113 and are arranged with a predetermined interval therebetween along the circumference direction of the rotation axis 121.

The blades 122 may be classified into a first blade row 122a, a second blade row 122b, a third blade row 122c, and a fourth blade row 122d according to expanded stages, as shown in FIG. 1.

Although the turbine apparatus 100 has a 4-stage structure in the current embodiment, wherein the blades 122 include the first to fourth blade rows 122a, 122b, 122c, and 122d, the exemplary embodiment is not limited thereto. That is, the number of stages in the turbine apparatus 100 is not limited, and accordingly, the number of blade rows is not limited either. For example, the turbine apparatus 100 may have a 10-stage structure, wherein the blades 122 are classified into 10 blade rows.

As shown in FIG. 2, the seal member 130 is installed in the seal installation groove 114 to seal a space between the casing 110 and the blades 122.

As shown in FIGS. 3 and 4, the seal member 130 is formed in an arc shape, and a plurality of seal members 130 may be installed in a row on a single seal installation groove 114. That is, the seal member 130 is installed in the seal installation groove 114, and the seal member 130 is formed to match the shape of the seal installation groove 114 formed in the circumference direction.

The seal member 130 has a stirrup-shaped(U-shaped) cross section as shown in FIG. 2 and comprises an upper part 131, a lower part 132 that is apart from the upper part 131 and is arranged below the upper part 131, and a connection part 133 for connecting the upper part 131 to the lower part 132, wherein a first space 130a is formed between the upper part 131 and the lower part 132.

A tip portion 134 is formed in a blade direction on the surface of the lower part 132 of the seal member 130 to face the blades 122.

The tip portion 134 includes a first tip portion 134a and a second tip portion 134b that is apart from the first tip portion 134a and is arranged at a location closest to the blades 122 from among parts in the seal member 130.

A plurality of flow pathways 132a are formed in the lower part 132 of the seal member 130 to connect to a space between the first tip portion 134a and the second tip portion 134b, thereby connecting a space between the blades 122 and the seal member 130 to the first space 130a.

The first space 130a is a space into which the compressed gas is introduced from the inlet 114a formed in the seal installation groove 114. The first space 130a is open in the rear direction of the casing 110 so that the open part faces the inlet 114a, while the first space 130a is closed in the front direction of the casing 110 by the connection part 133.

The elastic member 140 elastically connects the casing 110 to the seal member 130.

One end of the elastic member 140 is fixed to the inner surface of the seal installation groove 114 in the casing 110, and the other end thereof is fixed to the upper part 131 of the seal member 130.

The elastic member 140 is formed of a material having a different thermal expansivity from a material of the casing 110, and thus, a thermal behavior of the casing 110 and a thermal behavior of the elastic member 140, which vary according to an operation of the turbine apparatus 100, may not be influenced by each other. As a result, a thermal behavior of the seal member 130 connected to the elastic member 140 may not be influenced by the thermal behavior of the casing 110, thereby being easy to control the seal member 130.

However, the exemplary embodiment is not limited thereto. That is, the material of the casing 110 may have the same thermal expansivity as the material of the elastic member 140.

Although the elastic member 140 is a plate spring in the current embodiment, the exemplary embodiment is not limited thereto. That is, the elastic member 140 is not specifically limited as long as it is elastically connecting the casing 110 to the seal member 130. For example, the elastic member 140 may have a coil spring shape.

The frame 150 functions as a frame structure of the turbine apparatus 100.

Although the turbine apparatus 100 includes the frame 150 in the current embodiment, the exemplary embodiment is not limited thereto. That is, the turbine apparatus 100 according to the current embodiment may not include the frame 150 so that the casing 110 may function as the frame structure of the turbine apparatus 100. In this case, the casing 110 forms not only the outer surface of the turbine apparatus 100 but also is formed to extend towards the inside of the turbine apparatus 100 to perform the function of the frame 150.

The bearings 151 for supporting the rotation axis 121 are installed on the frame 150, and the casing 110 is also installed on the frame 150.

An operation of the turbine apparatus 100 according to an exemplary embodiment will now be described.

When a user starts the turbine apparatus 100, gas at high temperature and high pressure enters through the intake 111 of the casing 110, expands by passing through the nozzle vanes 113, and hits the blades 122. As such, the blades 122 rotate, thereby generating power.

According to the current embodiment, the user may increase the seal performance and simultaneously prevent a collision (rubbing phenomenon) between an edge part 122t of a blade 122 and the seal member 130 by optimally controlling a gap between the seal member 130 and the blades 122 of the rotor 120. An operation of controlling the gap between the seal member 130 and the blades 122 of the rotor 120 by controlling the movement of the seal member 130 will now be described with reference to FIG. 5.

Figure 5:
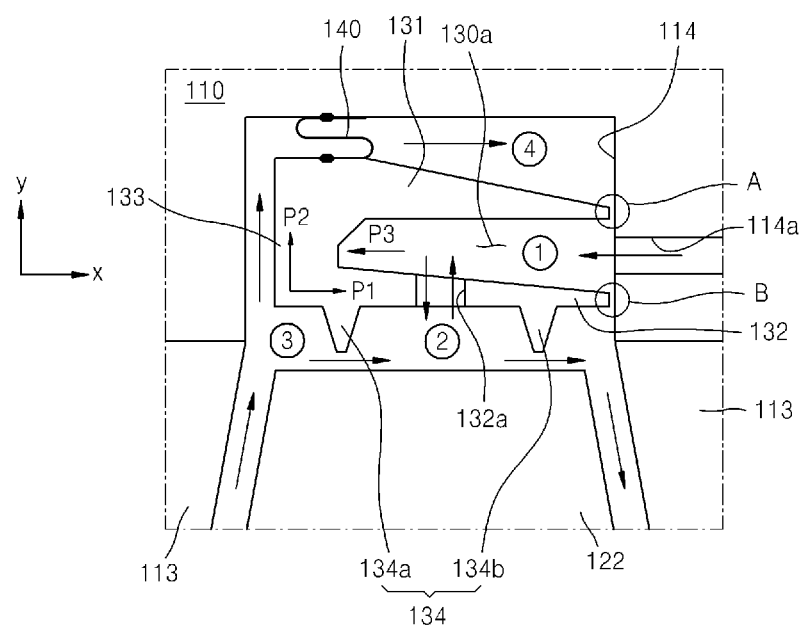
FIG. 5 is a schematic diagram for describing an operation of the seal assembly of the turbine apparatus, according to an exemplary embodiment.

FIG. 5 is a schematic diagram for describing an operation of the seal assembly in the turbine apparatus 100, according to an exemplary embodiment.

During an operation of the turbine apparatus 100, gas at high pressure flows from the front direction of a blade 122 to a space ④ via a space ③ and presses the seal member 130 with a force P1 forcing the seal member 130 to move in the rear direction (the positive direction of an x-axis) and a force P2 forcing the seal member 130 to move in the upper direction (the positive direction of a y-axis). As a result, the seal member 130 may excessively move in the upper direction (the positive direction of the y-axis) and also may excessively move in the rear direction (the positive direction of the x-axis) so that a jamming phenomenon at points A and B according to a collision between the seal member 130 and the inner surface of the seal installation groove 114 may occur.

However, in the current embodiment, the user may introduce compressed gas having an appropriate pressure through the inlet 114a formed in the seal installation groove 114 to control the gap between the seal member 130 and the blades 122 of the rotor 120. By doing as so, the introduced compressed gas flows into the first space 130a (a space ①) of the seal member 130, the compressed gas flowing into the first space 130a moves to the space between the first tip portion 134a and the second tip portion 134b via a flow pathway 132a so that a pressure in the first space 130a (the space ①) and a pressure in a space ② balance each other so that a force P3 makes the seal member 130 move in the front direction (the negative direction of the x-axis).

Thus, the user may optimally control the movement of the seal member 130 by selecting a shape and material of the elastic member 140 in consideration of the force P2 and an elastic force of the elastic member 140 in the y-axis direction and by adjusting the magnitude of a pressure of the compressed gas flowing through the inlet 114a in consideration of the forces P1 and P3 in the x-axis direction.

In more detail, the user may select an elastic coefficient, a shape, and a material of the elastic member 140 and may determine a pressure of the compressed gas flowing through the inlet 114a to obtain maximum seal performance by repeatedly performing experiments and simulations and may optimally operate the turbine apparatus 100 based on the experimental and simulation results.

For example, the user may appropriately adjust the pressure of the compressed gas flowing through the inlet 114a to balance the forces P1 and P3 so that the seal member 130 freely moves in the x-axis direction.

In the current embodiment, since the thermal behavior of the seal member 130 is not influenced by the thermal behavior of the casing 110 due to the structure and material of the elastic member 140, the movement of the seal member 130 is easily controlled as described below.

When a temperature of the turbine apparatus 100 increases after the turbine apparatus 100 starts operating, a thermal expansion speed of the casing 110 is faster than that of the rotor 120 due to a structural characteristic of the casing 110 enclosing the rotor 120. Thus, a gap between the inner wall of the casing 110 and the rotor 120 becomes temporarily wide. However, since the seal member 130 is installed using the elastic member 140 having a different thermal expansivity from the casing 110 in the current embodiment, the thermal behavior of the seal member 130 is not influenced by the thermal behavior of the casing 110. Thus, according to the current embodiment, an effect due to the thermal expansion may be reduced as much as possible when the movement of the seal member 130 is controlled.

In addition, when the operation of the turbine apparatus 100 is about to end, the temperature of the turbine apparatus 100 decreases, and in this case, a thermal reduction speed of the casing 110 is faster than that of the rotor 120 due to the structural characteristic of the casing 110 enclosing the rotor 120. Accordingly, the gap between the inner wall of the casing 110 and the rotor 120 is temporarily too narrow. However, since the seal member 130 is installed using the elastic member 140 having a different thermal expansivity from the casing 110 in the current embodiment, the thermal behavior of the seal member 130 is not influenced by the thermal behavior of the casing 110. Thus, according to the current embodiment, an effect due to the thermal reduction may be reduced as much as possible when the movement of the seal member 130 is controlled.

As described above, according to the exemplary embodiment, the user may optimally control the movement of the seal member 130 by selecting a shape and material of the elastic member 140 in consideration of the force P2 and an elastic force of the elastic member 140 in the y-axis direction and adjusting the magnitude of a pressure of the compressed gas flowing through the inlet 114a in consideration of the forces P1 and P3 in the x-axis direction. That is, the user may obtain optimal seal performance by optimally controlling the movement of the seal member 130, thereby increasing the performance of the turbine apparatus 100 and preventing occurrence of the rubbing phenomenon.

In addition, since the thermal behavior of the seal member 130 is not affected by the thermal behavior of the casing 110 due to the structure and material of the elastic member 140, the movement of the seal member 130 may be easily controlled.

While the present invention has been particularly shown and described with reference to exemplary embodiments thereof, it will be understood by those of ordinary skill in the art that various changes in form and details may be made therein without departing from the spirit and scope of the present invention as defined by the following claims.

Industrial Applicability

According to an aspect of an exemplary embodiment, there is provided a turbine seal assembly and a turbine apparatus.

The invention claimed is:

1. A turbine seal assembly comprising:
a seal installation groove formed inside a casing;
at least one seal member which comprises at least one tip portion formed in a blade direction and is installed in the seal installation groove; and
at least one elastic member for elastically connecting the casing to the seal member,
wherein the seal member comprises an upper part, a lower part being apart from the upper part, a connection part connecting the upper part to the lower part, and a first space formed between the upper part and the lower part,
wherein the first space is open toward a rear direction of the casing and connected to an inlet formed in the seal installation groove to introduce a compressed gas into the first space toward a front direction of the casing, and
wherein at least one flow pathway, which connects the first space to a second space formed between a blade and the seal member, is formed in the seal member.

2. The turbine seal assembly of claim 1, wherein the elastic member is a plate spring.

3. The turbine seal assembly of claim 1, wherein a thermal expansivity of a material of the elastic member is different from a thermal expansivity of a material of the casing.

4. The turbine seal assembly of claim 1, wherein the first space is closed toward the front direction of the blade.

5. The turbine seal assembly of claim 1, wherein the inlet is connected to a compressed gas tube connected to a compressor.

6. A turbine apparatus comprising:
a casing in which a seal installation groove is formed;
a rotor which is installed inside the casing and comprises a plurality of blades;
at least one seal member which comprises at least one tip portion formed toward a blade direction and is installed in the seal installation groove; and
at least one elastic member for elastically connecting the casing to the seal member,
wherein the seal member comprises an upper part, a lower part being apart from the upper part, a connection part connecting the upper part to the lower part, and a first space formed between the upper part and the lower part,
wherein the first space is open toward a rear direction of the casing and connected to an inlet formed in the seal installation groove to introduce a compressed gas into the first space toward a front direction of the casing, and
wherein at least one flow pathway, which connects the first space to a second space formed between a blade and the seal member, is formed in the seal member.

7. The turbine apparatus of claim 6, wherein the tip portion comprises a first tip portion and a second tip portion formed apart from the first tip portion.

8. The turbine apparatus of claim 6, wherein a thermal expansivity of a material of the elastic member is different from a thermal expansivity of a material of the casing.

9. The turbine apparatus of claim 6, wherein the first space is closed toward the front direction of the blade.

10. The turbine apparatus of claim 6, wherein the inlet is connected to a compressed gas tube connected to a compressor.

* * * * *